(12) United States Patent
Kaneta

(10) Patent No.: US 7,700,227 B2
(45) Date of Patent: Apr. 20, 2010

(54) MODULE

(75) Inventor: Hiroshi Kaneta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/176,576

(22) Filed: Jul. 21, 2008

(65) Prior Publication Data

US 2008/0280199 A1    Nov. 13, 2008

Related U.S. Application Data

(63) Continuation of application No. 10/956,514, filed on Sep. 30, 2004, now abandoned, which is a continuation of application No. PCT/JP03/06934, filed on Jun. 2, 2003.

(30) Foreign Application Priority Data

Jun. 3, 2002    (JP)    ............................. 2002-161396

(51) Int. Cl.
  *H01M 6/42* (2006.01)
(52) U.S. Cl. .................. 429/159; 429/138; 429/149; 429/151; 429/152; 429/153; 429/154; 429/163; 429/180; 429/185
(58) Field of Classification Search .................. 429/138, 429/148, 149, 151, 152, 153, 154, 155, 159, 429/162, 163, 180, 185
See application file for complete search history.

(56) References Cited

U.S. PATENT DOCUMENTS 4,177,552 A    12/1979   Gordon et al.
5,871,861 A *  2/1999    Hirokou et al.  ............. 429/149
6,489,054 B2 * 12/2002   Cheiky et al.   ............. 429/185

FOREIGN PATENT DOCUMENTS

| JP | 11176400   | 7/1999 |
| JP | 2002-208385 | 7/2002 |

OTHER PUBLICATIONS

International Preliminary Examination Report dated Mar. 4, 2004 for corresponding International Application No. PCT/JP03/06934.
International Search Report dated Sep. 24, 2003 for corresponding International Application No. PCT/JP03/06934.

* cited by examiner

*Primary Examiner*—Patrick Ryan
*Assistant Examiner*—Ben Lewis
(74) *Attorney, Agent, or Firm*—Katten Muchin Rosenman LLP

(57) ABSTRACT

A flat secondary battery having a fusion-bonded sealing type laminate film as an armored body tends to be inferior in sealing reliability to a flat secondary battery having a welded sealing type can as an armored body, due to a difference in sealing method between the two batteries. Therefore, there has been a large challenge of finding the way to make the sealing reliability of the laminate film secondary battery closer to that of the can type secondary battery.

The sealing reliability is improved by further increasing a sealing force without taking any measure to the existing laminate film secondary battery, in such a manner that the fusion bonding area of the existing laminate film secondary battery is sandwiched from upside and downside to be cramped from outside so as to mechanically add a sealing force from outside to the sealing force of the laminate film itself.

28 Claims, 9 Drawing Sheets

MODULE

CROSS-REFERENCE TO RELATED APPLICATION

The present application is a continuation of U.S. patent application Ser. No. 10/956,514 filed on Sep. 30, 2004, pending at the time of filing of this application, which is a continuation of International Application No. PCT/JP03/06934, filed on Jun. 2, 2003, which claims priority from Japanese Application 161396/2002 filed on Jun. 3, 2002, which is herein incorporated by reference.

TECHNICAL FIELD

The present invention relates to a module constructed using a flat laminate film secondary battery, and more particularly to a structure for cramping the flat laminate film secondary battery.

BACKGROUND ART

Generally, a metal can type secondary battery is the most dominant type of secondary battery, and in many cases, this battery is produced in such a manner that, after inclusion of a power generating element and an electrolyte in a metal can, a step of extracting electrodes is performed and lastly, a metal cover is laser welded. Thus, the can type secondary battery has a high sealing property, being advantageous in having a very few problems in terms of leakage of an electrolyte from a metal can to outside, even in a long-term use. Meanwhile, there has been a strongly demand for an improved weight density as well as shape flexibility, being attributed to the recent appearance of an increasing number of secondary batteries having a laminate film as an armored body which are lighter than the metal can type secondary battery and have shape flexibility.

A laminate film used a laminate film secondary battery is obtained by bonding a nylon sheet to the front surface of a thin aluminum sheet, and adhering a polyethylene sheet or polypropylene sheet, in general, having a fusion bonding property, to the rear surface of the thin aluminum sheet. After wrapping a power generating element with this aluminum laminate film and extracting electrodes, three or four sides of the laminate film are fusion-bonded to produce a secondary battery, which is often called a laminate film secondary battery. Because the laminate film type secondary battery structurally has fusion-bonded sides, the sealing property of the fusion-bonded sides can be said to be related to the electrolyte leakage problem. Under present circumstances, however, it has been difficult that the sealing property obtained by fusion bonding secures longer-term reliability than the sealing property obtained by laser welding in the can type battery, and it has therefore been a large challenge for the laminate film type secondary battery to extend the life of the sealing property.

PROBLEMS THAT THE INVENTION IS TO BE SOLVED

The present invention has been made in view of the above-mentioned situation, and an object of the present invention is to improve a sealing property of a flat laminate film secondary battery.

DISCLOSURE OF THE INVENTION

A sealing force of a flat laminate film secondary battery having a laminate film as an armored body typically depends on fusion bonding performance of the laminate film, and the long-term reliability of the sealing force is proportional to a fusion bonding width. In the case of securing a five-year period of sealing reliability, for example, the fusion bonding width may be narrow when the sealing force is large, but on the contrary, the fusion bonding width needs to be sufficiently wide when the sealing force is small.

On the other hand, when a sealing property of a can type battery is compared with that of a laminate type battery, it is obvious due to the difference in sealing method that the welded sealing method of the can type battery is more preferred. For making the sealing property of the laminate film as close to that of the can type battery as possible, it is necessary to improve the fusion bonding performance of the laminate film and also to widen the fusion bonding width thereof.

However, the improvement in fusion bonding performance of the laminate film requires development cost as well as a certain length of time, and the extension of the fusion bonding width requires development cost for a dedicated sealing device as well as a certain length of time. There is further a problem that an increase in material cost causes an increase in product cost. Accordingly, the present invention proposes a module structure where the sealing force of the existing laminate film itself is added with a sealing force from outside so as to become as close to the sealing property of the can type battery as possible.

A module structure proposed in the present invention is that a four-side sealing section of an existing flat laminate film secondary battery having a laminate film as an armored body is mechanically cramped from upside and downside by module covers via sealing accessory plates. With the interposition of the sealing accessory plates, the sealing force of the laminate film itself is added with a sealing force to cramp the sealing section by the covers and the sealing accessory plates, making it possible to further improve the sealing property of the laminate film itself.

Accordingly, the present invention provides a module characterized in that a flat laminate film secondary battery is included in (fixed into) the module, and a part or whole of a laminate film sealing section area of the flat laminate film secondary battery is sandwiched from upside and downside by sealing accessory plates. In this case, it is appropriate that the above-mentioned sealing accessory plates are cramped by the top and bottom covers of the module.

In order to describe the module structure of the present invention, first, a conventional module structure is taken as an example. FIGS. 1 and 2 illustrate conventional module structures. FIG. 1 illustrates a structure obtained by housing a flat laminate film secondary battery 3 in a box case 9 and injecting a filler 10 into a space between the box case 9 and the flat laminate film secondary battery 3 to fix the flat laminate film secondary battery 3 into the case. In some conventional module structures, a rubber sheet 5 is interposed in a space between the box case 9 and the flat laminate film secondary battery 3.

FIG. 2 illustrates a top-and-bottom-cover-type module structure, obtained by sandwiching the flat laminate film secondary battery 3 between a top cover 1 and a bottom cover 2 to fix the flat laminate film secondary battery 3 by the force pinched between the two covers. While there are some cases where the rubber sheet 5 is interposed between the fixed surface of the flat laminate film secondary battery 3 and each of the top and bottom covers 1 and 2, and there are other cases where the filler 10 is injected into a space created between each side face of the flat laminate film secondary battery 3 and the top and bottom covers 1 and 2, the basic structure is to fix the flat laminate film secondary battery 3 by the force pinched by the top and bottom covers 1 and 2.

In any of the above-mentioned structures, the sealing property of the flat laminate film secondary battery depends on the sealing force of the laminate film itself. After the construction of the module, even the injection of the filler 10 into spaces, created with the flat laminate film secondary battery within the module, does not lead to addition of an external force to the laminate sealing portion, and therefore, also in this case, the sealing property of the flat laminate film secondary battery depends on the sealing force of the laminate film itself.

As opposed to this, the present invention provides a structure that can solve a problem having been unsolvable with the conventional module structures. A fundamental action of the present invention is described using FIG. 3. As illustrated in FIG. 3, the module structure of the present invention is that a laminate film sealing area 11 of the flat laminate film secondary battery 3 is cramped so as to be sandwiched from upside and downside by the top and bottom covers 1 and 2 of the module via the sealing accessory plates 4, and hence the laminate film sealing area 11 is mechanically cramped by the sealing accessory plates 4. Thereby, the sealing force of the laminate film itself is added with a sealing force of the sealing accessory plates 4 from outside by the sandwiching force, to improve the sealing property of the laminate film. The sealing area 11 is represented with a filled-in area in FIG. 4 illustrating a perspective view of a flat laminate film secondary battery, and this is a section sealed by fusion bonding.

In order to achieve the module structure of the present invention, it is required that the sealing accessory plate 4 has stiffness for sandwiching the sealing section area of the laminate film from upside and downside to improve the sealing property. In the meantime, since electrodes are extracted from the laminate film armored body, and the cross section of the electrode-extracting side of the sealing section has a concavo-convex configuration as illustrated in FIG. 5, it is preferable that an elastic material capable of tracing the concavo-convex configuration be applied to the sealing accessory plate 4. FIG. 6 illustrates a concavo-convex configuration in the case of extracting positive and negative electrodes from one end, and also in this case, it is preferable that an elastic material capable of tracing the concavo-convex configuration be applied to the sealing accessory plate 4.

The sealing accessory plate preferably applied may include: a sealing accessory plate 4 made of an elastic plastic material capable of tracing a concavo-convex configuration, of the combination of an elastic plastic material and a metal material or of the combination of an elastic plastic material and a high rigid plastic material; and a sealing accessory plate 6 (FIG. 7) made of a flat rubber gasket having a thickness as large as or larger than the thickness of the flat laminate film secondary battery 3.

In sandwiching the sealing area 11 of the laminate film by the sealing accessory plates 4 or 6, although any degree of pinching force is expected to bring some effect, the sealing force is desirably made as large as possible. In the case of the sealing accessory plate 4, however, generation of a large pinching force requires an increase in rigidity of the sealing accessory plate 4, and the weight of the sealing accessory plate 4 naturally increases. In the case of the sealing accessory plate 6, the stiffness of the top and bottom covers 1 and 2 of the module need increasing for sufficient deformation by compression of the sealing accessory plate 6, and the weights of the top and bottom covers 1 and 2 naturally increase. Considering a weight density as a module, the total weight increase should be suppressed to the maximum extent.

Figure 1:
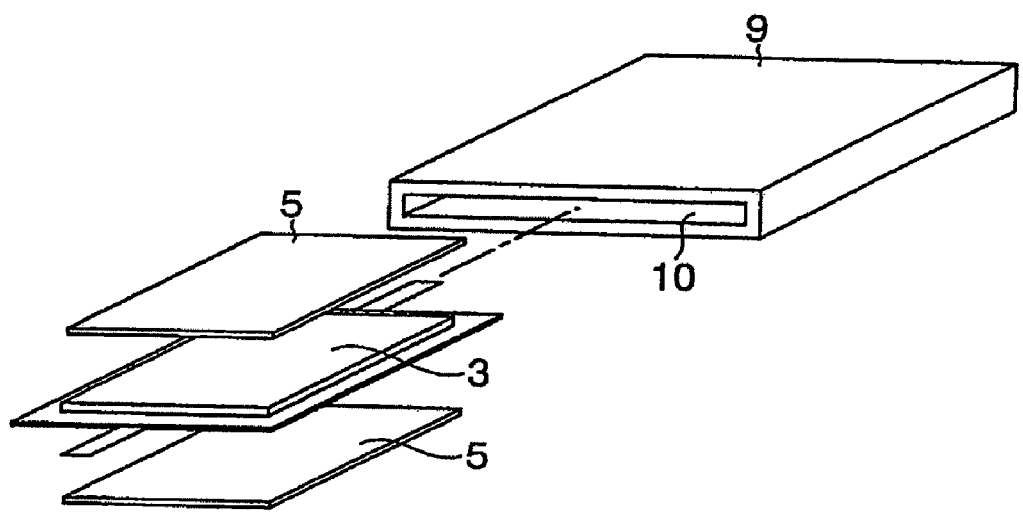
FIG. 1 is an explanatory view of a structure of a conventional module A.

It is to be noted that Reference numeral 1 denotes a module top cover. Reference numeral 2 denotes a module bottom cover. Reference numeral 3 denotes a flat laminate film secondary battery. Reference numeral 4 denotes a sealing accessory plate (the type made of the combination of a high rigidity material and an elastic material). Reference numeral 5 denotes a sponge sheet. Reference numeral 6 denotes a sealing accessory plate (the type made of an elastic material alone). Reference numeral 7 denotes an electrode. Reference numeral 8 denotes a laminate film. Reference numeral 9 denotes a box case. Reference numeral 10 denotes a filler. Reference numeral 11 denotes a laminate film fusion bonding area of a flat laminate film secondary battery.

BEST MODE FOR CARRYING OUT THE INVENTION

Figure 3:
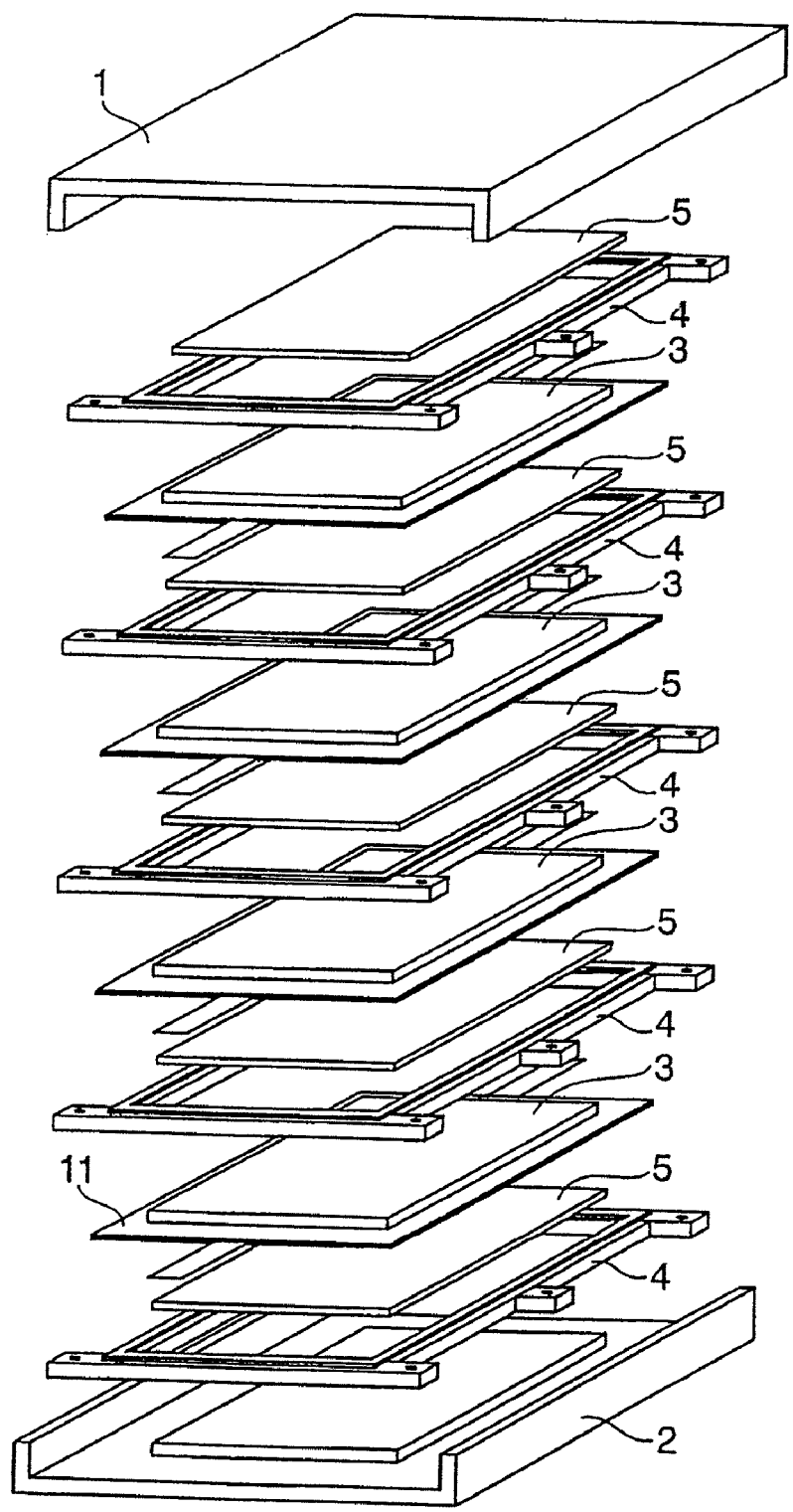
FIG. 3 is an explanatory view illustrating a module structure of the present invention.
Figure 4:
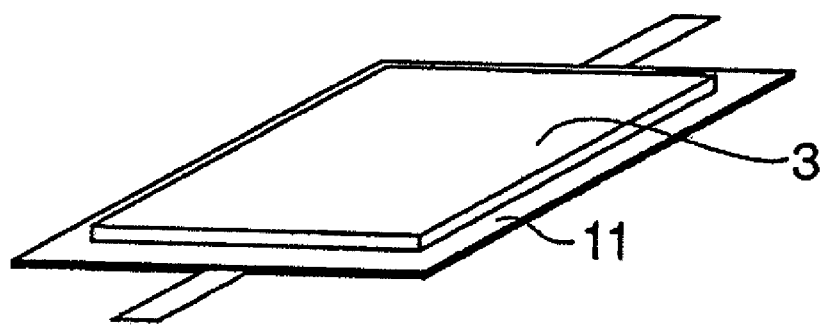
FIG. 4 is an explanatory view of a fusion-bonded sealing area of a flat laminate film secondary battery.
Figure 5:
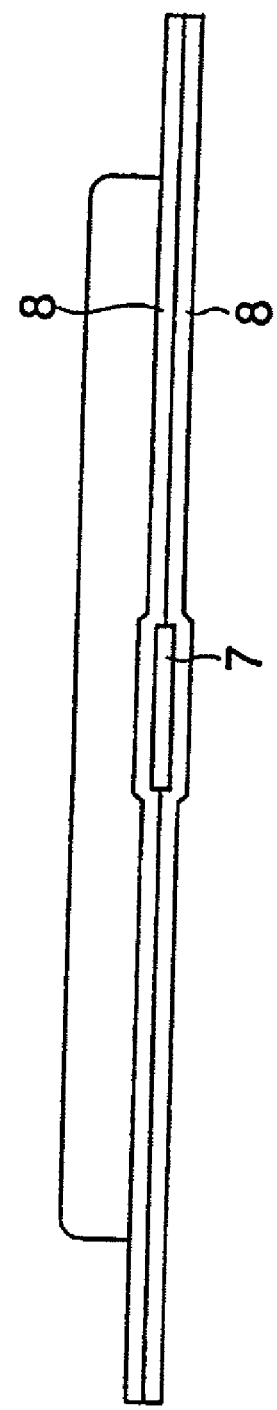
FIG. 5 is an enlarged view of an electrode-extracting section of a flat laminate film secondary battery of the type constructed to extract electrodes from the opposing sides.
Figure 6:
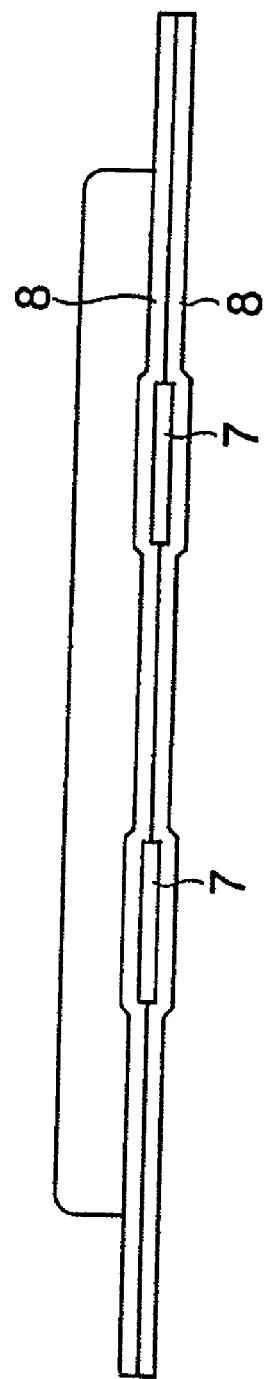
FIG. 6 is an enlarged view of an electrode-extracting section of a flat laminate film secondary battery of the type constructed to extract electrodes from the same side.

An embodiment of the present invention will be described below with reference to attached drawings. As illustrated in FIG. 3, the embodiment of the present invention is characterized by a structure to sandwich the flat laminate film secondary battery 3 between the module top and bottom covers 1 and 2, respectively via the sealing accessory plates 4. The sealing accessory plates 4 are disposed so as to sandwich, from upside to downside, the sealing area 11 of the laminate film as the armored body of the flat laminate film secondary battery 3.

Since the sealing accessory plate 4 is required to have rigidity or stiffness for mechanically cramping the sealing area of the laminate film, it is appropriate that a high rigid metal material or a high rigid plastic material is used for the sealing accessory plate 4. Meanwhile, since electrodes are extracted from the laminate film sealing area, the cross section of the electrode-extracting side of the sealing section has a concavo-convex configuration. It is therefore desirable to apply an elastic material capable of tracing the concavo-convex configuration to the sealing accessory plate 4. Hence, the sealing accessory plate 4 made of the combination of a rubber gasket as an elastic material capable of tracing the concavo-convex configuration and a high rigid metal material or a high rigid plastic material may be employed. Further, the sealing accessory plate 4 may be produced of only an elastic material with a small amount of compression permanent distortion. In this case, the thickness of the sealing accessory plate needs to be designed in consideration of the relationship between the compression permanent distortion amount of the material rubber and a pressurizing force of the same.

As a material for the module armored body, common metal materials, reinforced plastics and the like can be cited as examples. In the module structure of the present invention, the sealing accessory plate is cramped by each of the top and bottom covers of the module, generating the sealing force of the sealing accessory plate, with which the laminate film sealing section of the flat laminate film secondary battery is cramped, and therefore, the larger the force to cramp the sealing section, the more effectively it acts. For this reason, a high rigidity metal material is desired as the material for the module armored body; however, the use of such a metal material is disadvantageous in that a weight density as a module becomes undesirably small, and it is thus necessary to choose the most suitable material consistent with application of an module.

In the case where the sealing accessory plate is made of a high rigidity metal material or a high rigidity plastic material and an elastic rubber gasket, if the high rigidity materials for the respective sealing accessory plates 4 to cramp the sealing area 11 of the laminate film from upside and downside have been cramped with bolts or the like so as to apply a cramping force to the sealing area 11, the module top and bottom covers are required to have a cramping force just to an extent that the flat laminate film secondary battery assembly is kept from moving within the module, and it is thereby possible to chose the material for the module armored body among a wide range of materials from low rigid materials to high rigid materials.

On the other hand, in the case where the sealing accessory plate 6 is produced using only an elastic rubber material with a small amount of compression permanent distortion, the module armored body is required to have a force to distort the sealing accessory plate 6 and also to cramp the sealing area 11 of the laminate film from upside and downside, and it is therefore desirable to choose the material for the module armored body among high rigid metal materials or high rigid plastic materials.

However, because the sealing property is expected to improve at least from the sealing property of the laminate film itself due to the existence of the force from outside to cramp the sealing area 11 of the laminate film, the materials for the combination of the sealing accessory plate 6 and the module armored body are basically not specified.

In the following, Example 1 of the present invention is described using FIG. 8. First, an ABS resin was employed as the material for the module. The dimensions of the top and bottom covers 1 and 2 were W105 mm×D170 mm×T7 mm (thickness: 5 mm), and a bolt hole for fixing was provided at each side. The sealing accessory plate 4 was made of an SUS material and the dimensions thereof were 90 mm×140 mm×3 mm while the flame width thereof was 10 mm (internal hollow section: 70 mm×120 mm), and a groove of 2 mm wide×1 mm deep was formed in the flame width center of each of the top and under surfaces of the sealing accessory plate. Further, a protrusion for fixing a bolt was provided at each side of the sealing accessory plate 4. As the elastic rubber, silicone rubber of 2 mm per side was employed and placed in the flame grooves of the sealing accessory plate 4 to complete the sealing accessory plate 4 of the present invention.

As the flat laminate film secondary battery 3 having a laminate film as an armored or an outer-covered body, a laminated type battery including a power generating element was employed, the power generating element being formed by laminating a positive electrode and a negative electrode with a separator interposed therebetween, and impregnated with a non-aqueous electrolyte. The dimensions of the flat laminate film secondary battery 3 were W90 mm×D140 mm×T4 mm, and the dimensions of the included power generating element were W70 mm×D124 mm×T3.8 mm. Further, the thickness of the laminate film as the armored body was 100 μm, and the fusion bonding width (sealing area width) of the laminate film was 10 mm.

Figure 8:
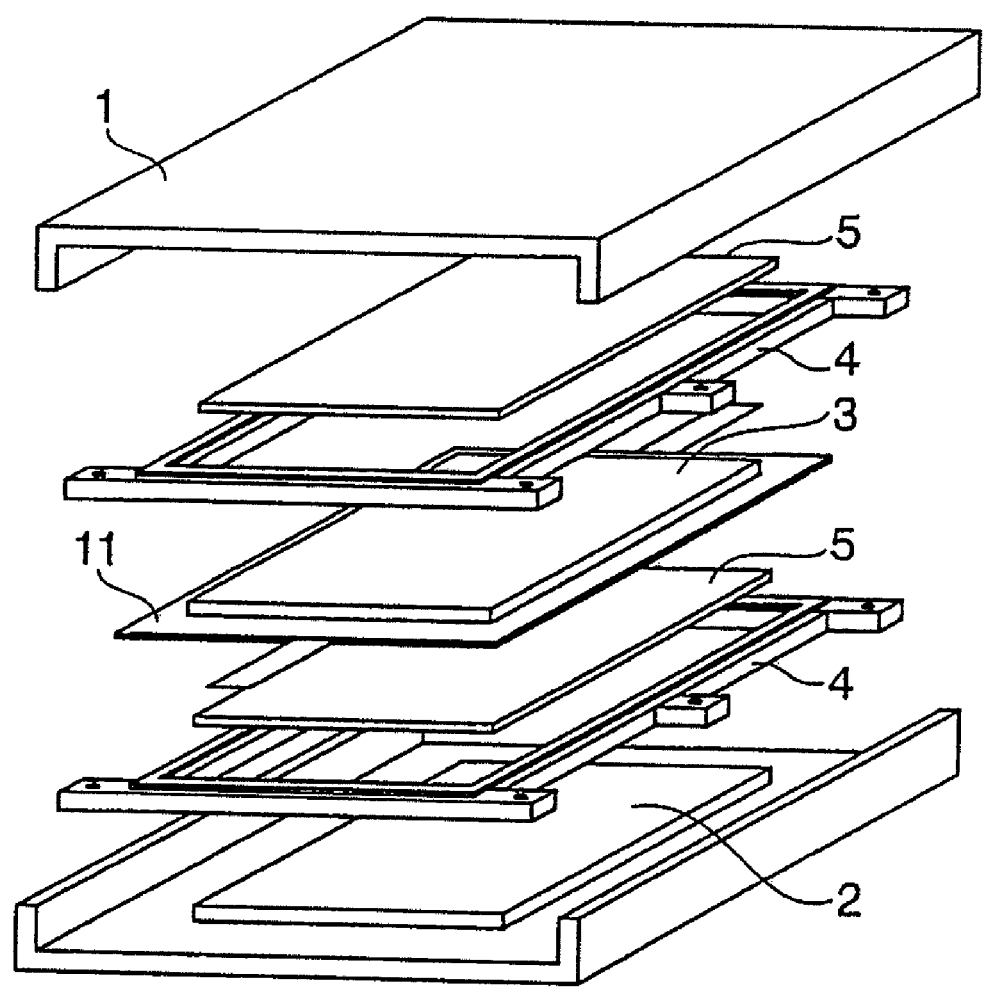
FIG. 8 is an explanatory view illustrating a module structure of Example 1 of the present invention.

In the above-mentioned construction, as illustrated in FIG. 8, the flat laminate film secondary batteries 3 were laminated via the sealing accessory plates 4 and the silicone type sponge sheets 5, and the sealing accessory plates 4 were fixed with bolts. At this time, pressure sensitive paper was placed between the rubber gasket area of the sealing accessory plate 4 and the sealing area 11 of the laminate film to adjust the pinching force. The silicone type sponge sheet 5 employed in the present example is a sheet having a hardness of about 25. However, the employed silicone type sponge sheet 5 is not characterized by the hardness thereof; the sheet is intended to fill a space created between the laminate film secondary batteries when laminated, and may thus have a high degree of elasticity and be sufficiently softer than the silicone rubber of the sealing accessory plate 4. In the present example, with consideration given to a compression permanent distortion amount of the employed silicone rubber for the sealing accessory plate, a surface pressure was set to be not smaller than 1 $kgf/cm^2$. The total weight corresponds to about 10 kgf.

Eventually, the bolt-fixing unit comprising the sealing accessory plates 4, the flat laminate film secondary batteries 3 and the silicone type sponge sheets 5 was pinched between the module top and bottom covers 1 and 2.

Figure 7:
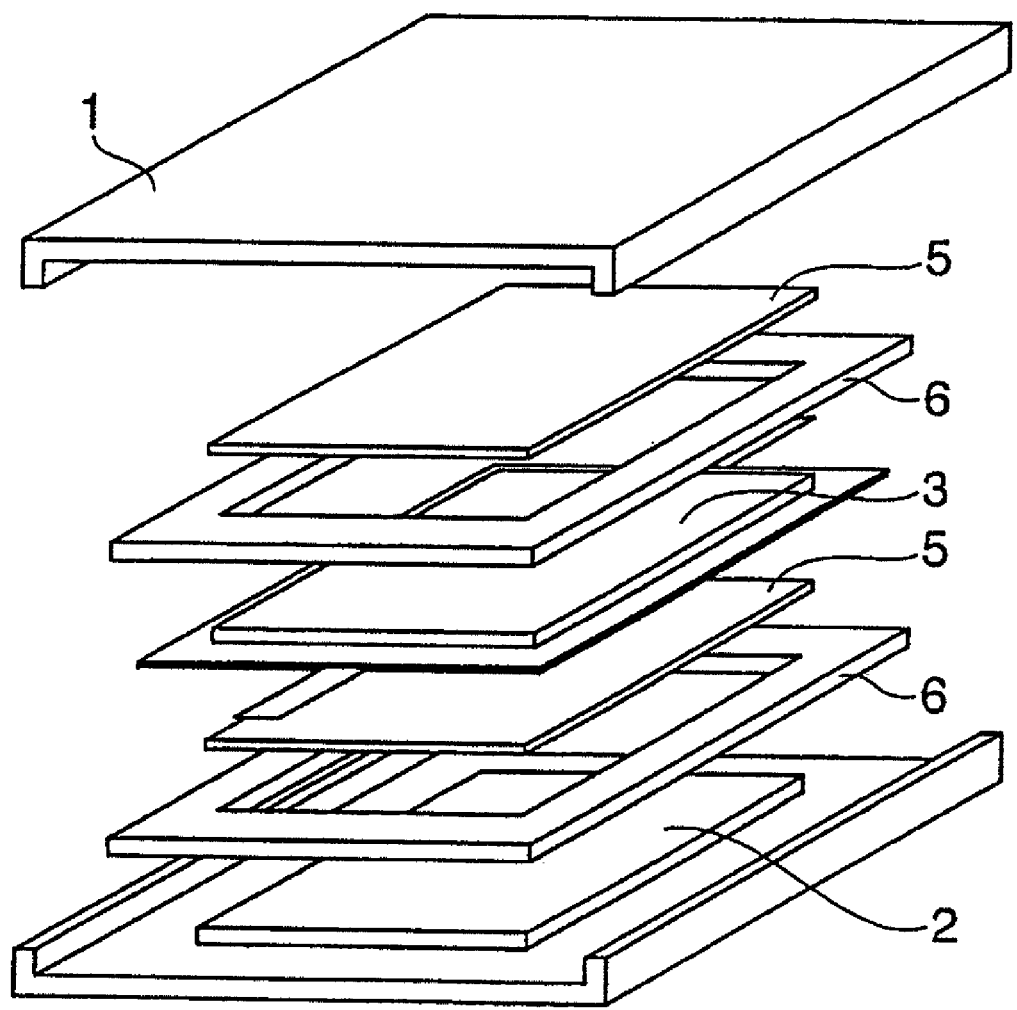
FIG. 7 is an explanatory view illustrating a module structure of Example 2 of the present invention.

Next, Example 2 is described using FIG. 7. First, a glass epoxy resin was employed as the material for the module. The glass epoxy resin is one of those epoxy resins having high rigidity compared to other epoxy resins. The dimensions of the module top and bottom covers 1 and 2 were W105 mm×D170 mm×T7 mm (thickness: 5 mm), as those in Example 1. The sealing accessory plate 6 was made of elastic rubber alone, and as the material for the sealing accessory plate 6, silicone rubber was employed. The dimensions thereof were 90 mm×140 mm×4.5 mm while the flame width thereof was 10 mm (internal hollow section: 70 mm×120 mm). As the flat laminate film secondary battery 3 having a laminate film as an armored body, the same one as in Example 1 was employed.

In the above-mentioned construction, as illustrated in FIG. 7, the flat laminate film secondary batteries 3 were laminated via the sealing accessory plates 6 (silicone rubber with an internal hollow section) and the silicone type sponge sheets 5, and the sealing accessory plates 6 and the flat laminate film secondary batteries 3 were sandwiched between the module top and bottom covers 1 and 2 to be fixed. At this time, pressure sensitive paper was placed between the sealing accessory plate 6 (silicone rubber with an internal hollow section) and the sealing area 11 of the laminate film to adjust the sandwiching force. The silicone type sponge sheet 5 employed in present Example 2 is the same one as that in Example 1. In the present example, with consideration given to a compression permanent distortion amount of the employed silicone rubber, a surface pressure was set to be about 1 $kgf/cm^2$. The total weight corresponds to about 42 kgf.

Although one flat laminate film secondary battery was used in Examples 1 and 2 described above, the present structure is not limited to one battery and is applicable to a plurality of flat laminate film secondary batteries. Further, the number as well as the position of the bolts to fix the sealing accessory plates 4 is not limited, and the bolts may be disposed so as to uniformly fix the plates.

Figure 9:
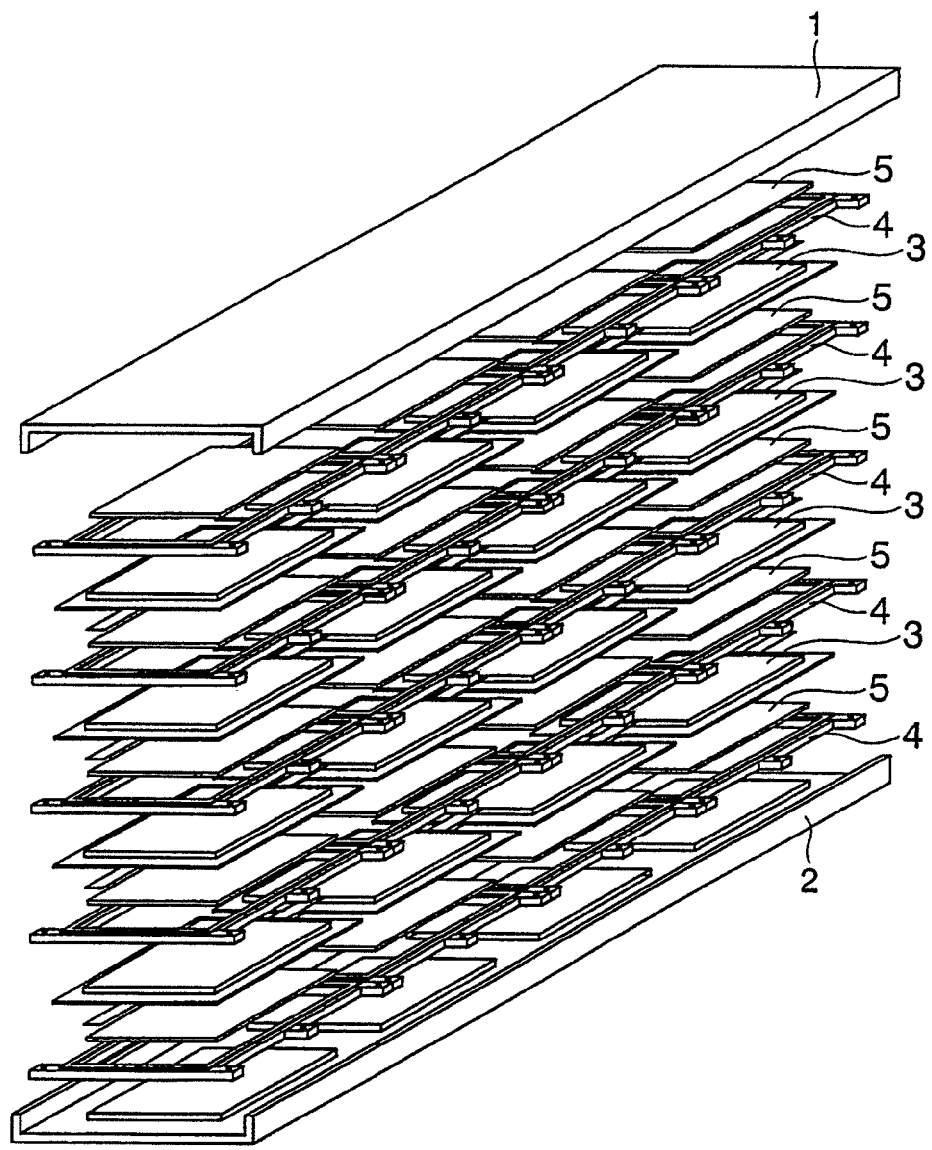
FIG. 9 is an explanatory view illustrating one example of module structures (example of a large sized module of 16 serials in four columns and four rows) of the present invention.

FIG. 9 illustrates one example of construction of a large sized module of 16 serials by using 16 flat laminate film secondary batteries 3 in four columns and four rows.

Subsequently, a sealing property evaluation was conducted using two kinds of conventional modules and the modules of Examples 1 and 2. The sealing property evaluation is a harsh evaluation where a laminate film secondary battery module is stood still in an environment of high temperature and humidity to promote dissolution of an electrolyte in the laminate film secondary battery, while water is penetrated to enter from a fusion bonding layer of a laminate film to produce hydrofluoric acid, acceleratingly degrading a sealing property of the fusion bonded sealing section of the laminate film to cause leakage of the electrolyte from the secondary battery. The test was conducted under the environment of 60° C./90% RH and the electrolyte leakage was determined using litmus paper.

Figure 2:
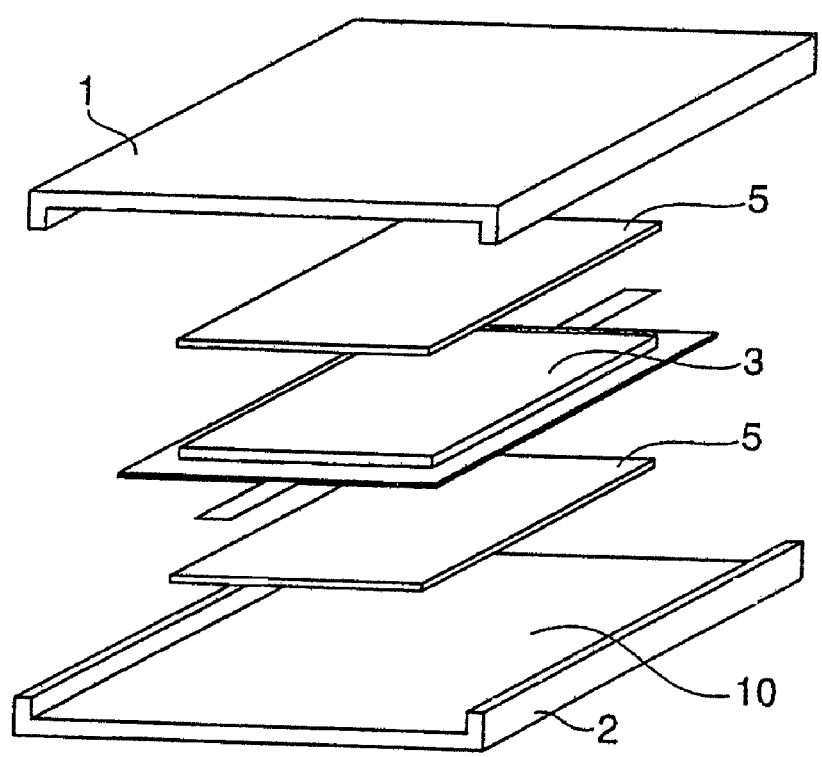
FIG. 2 is an explanatory view of a structure of a conventional module B.

As illustrated in FIG. 1, the conventional module A was constructed such that the flat laminate film secondary battery 3 and the sponge sheet 5 were pushed into an aluminum-made cylindrical can case 9 with a thickness of 1 mm. The conventional module B illustrated in FIG. 2 was constructed such that the flat laminate film secondary battery 3 was sandwiched between SUS-material-made top and bottom covers 1 and 2 with a thickness of 3 mm, respectively via upper and lower silicone type sponge sheets 5 with a thickness of 1 mm. It is to be noted that the filler 10 is not used in the conventional modules A and B for comparison, in view of the sealing evaluation.

Table 1 shows the results of the sealing property evaluation test. In Table 1, the sealing properties of the conventional module B and the modules of the present examples are compared, on the basis of the period during which the laminate film sealing property of the conventional module A deteriorated and electrolyte leakage occurred, by means of a resistance period ratio (magnification of resistance period during which the electrolyte leakage was confirmed). As apparent from Table 1, it was found that the modules of Examples 1 and 2 have the resistance period 2.5 times or more longer than the resistance period of the conventional module A. Although the period during which the electrolyte leakage occurred in each of the modules of the present examples was not specified in view of the evaluation period, it is at least found that the sealing property as a module improves by 2.5 times or more by mechanically sandwiching the fusion-bonded sealing section of the laminate film from upside and downside.

TABLE 1

| | Conventional module A | Conventional module B | Example 1 | Example 2 |
| --- | --- | --- | --- | --- |
| Magnification of resistance period | 1 | 1.2 | 2.5 or more | 2.5 or more |

As thus described, employment of the module structure of the present invention enables improvement in sealing property by 2.5 times or more from the sealing property obtained in the conventional module structure. Moreover, expansion of the module structure of the present invention enables constitution of a large sized module.

INDUSTRIAL APPLICABILITY

The module structure of the present invention has the effect of improving a total sealing force (sealing property) in such a manner that the fusion-bonded sealing area of the flat laminate film secondary battery is sandwiched from upside and downside to be mechanically cramped, and thereby the sealing force of the laminate film itself is added with a mechanical sealing force from outside. Moreover, since the structure of the present invention can be applied to either a single battery or a plurality of batteries, it has the effect of maintaining the state where the sealing property has been improved, in construction of a larger sized module. Furthermore, the structure of the present invention has the effect of freely setting a sealing force as a module by selecting the materials for the sealing accessory plate and the module armored body.

What is claimed is:

1. A module comprising:
    a flat laminate film secondary battery, the battery comprising a laminate film sealing section area that is fusion-bonded at sides of said battery to seal an electrolyte fluid of the battery,
    wherein a part or whole of said sealing section area is sandwiched and mechanically clamped by an upper sealing accessory plate and a lower sealing accessory plate, the upper and lower sealing accessory plates being disposed around the battery,
    wherein the upper sealing accessory plate and the lower sealing accessory plate provide in combination a concavo-convex configuration to accommodate an electrode of the flat laminate film secondary battery, and
    wherein an external force is provided to the upper sealing accessory plate and the lower sealing accessory plate to sandwich and mechanically clamp the part or whole of said sealing section area.

2. The module according to claim 1, wherein said sealing accessory plates are clamped by a top cover and a bottom cover of the module.

3. The module according to claim 2, wherein the flat laminate film secondary battery has a power generating element including alternating layers of a positive electrode, a separator and a negative electrode.

4. The module according to claim 2, wherein said sealing accessory plates are made of a highly rigid plastic material alone.

5. The module according to claim 2, wherein said sealing accessory plates are made of a metal material alone.

6. The module according to claim 1, wherein said sealing accessory plates are made of an elastic plastic material alone, of the combination of an elastic plastic material and a metal material, or of the combination of an elastic plastic material and a highly rigid plastic material.

7. The module according to claim 2, wherein said sealing accessory plates are made of an elastic plastic material alone, of the combination of an elastic plastic material and a metal material, or of the combination of an elastic plastic material and a highly rigid plastic material.

8. The module according to claim 6, wherein the flat laminate film secondary battery has a power generating element including alternating layers of a positive electrode, a separator and a negative electrode.

9. The module according to claim 7, wherein the flat laminate film secondary battery has a power generating element including alternating layers of a positive electrode, a separator and a negative electrode.

10. The module according to claim 7, wherein said sealing accessory plates are made of an elastic plastic material alone.

11. The module according to claim 7, wherein said sealing accessory plates are made of a combination of an elastic plastic material and a highly rigid plastic material.

12. The module according to claim 1, wherein the flat laminate film secondary battery has a power generating element including alternating layers of a positive electrode, a separator and a negative electrode.

13. The module according to claim 1, wherein said sealing accessory plates are made of a combination of an elastic plastic material and a metal material.

14. The module according to claim 1, wherein said sealing section area is sandwiched and mechanically clamped while the battery is used.

15. A module comprising:
a flat laminate film secondary battery including a laminate film sealing section area, the laminate film sealing section area sealing an electrolyte fluid of the battery;
an upper sealing accessory plate; and
a lower sealing accessory plate;
wherein at least a part of the laminate film sealing section area is arranged between the upper sealing accessory plate and the lower sealing accessory plate, the upper and lower sealing accessory plates being disposed around the battery;
wherein the upper sealing accessory plate and the lower sealing accessory plate form a seal around said flat laminate film secondary battery;
wherein the upper sealing accessory plate and the lower sealing accessory plate provide in combination a concavo-convex configuration to accommodate an electrode of the flat laminate film secondary battery; and
wherein an external force is provided to the upper sealing accessory plate and the lower sealing accessory plate to sandwich and mechanically clamp the part or whole of said sealing section area.

16. The module according to claim 15, wherein said sealing section area is sandwiched and mechanically clamped while the battery is used.

17. A module comprising:
a flat laminate film secondary battery, including a laminate film sealing section area that is fusion-bonded at sides of said battery to seal an electrolyte fluid of the battery,
wherein a part or whole of said sealing section area is being sandwiched and is mechanically being clamped by an upper sealing accessory plate and a lower sealing accessory plate with a sandwiching force, the upper and lower sealing accessory plates being disposed around the battery; and
wherein an external force is provided to the upper sealing accessory plate and the lower sealing accessory plate to sandwich and mechanically clamp the part or whole of said sealing section area.

18. The module according to claim 17, wherein the sandwiching force is provided by bolts fastening the sealing accessory plates together.

19. The module according to claim 17, wherein the sandwiching force is provided by clamping of a top cover and a bottom cover of the module.

20. The module according to claim 19, wherein the clamping is generated by bolts running through the top cover and the bottom cover.

21. The module according to claim 17, wherein said sealing accessory plates are made of an elastic plastic material alone, of the combination of an elastic plastic material and a metal material, or of the combination of an elastic plastic material and a highly rigid plastic material.

22. The module according to claim 17, wherein the flat laminate film secondary battery has a power generating element including alternating layers of a positive electrode, a separator and a negative electrode.

23. The module according to claim 17, wherein the sandwiching force is provided by bolts fastening the sealing accessory plates together.

24. The module according to claim 17, wherein the upper sealing accessory plate and the lower sealing accessory plate provide in combination a concavo-convex configuration to accommodate an electrode of the flat laminate film secondary battery.

25. A primary battery comprising:
a plurality of modules, each module comprising
a flat laminate film secondary battery, the battery comprising a laminate film sealing section area that is fusion-bonded at sides of said battery to seal an electrolyte fluid of the battery,
wherein a part or whole of said sealing section area is sandwiched and mechanically clamped by an upper sealing accessory plate and a lower sealing accessory plate, the upper and lower sealing accessory plates being disposed around the battery, and
wherein an external force is provided to the upper sealing accessory plate and the lower sealing accessory plate to sandwich and mechanically clamp the part or whole of said sealing section area.

26. The primary battery of claim 25, wherein said sealing accessory plates are clamped by a top cover and a bottom cover of the module.

27. The primary battery of claim 25, wherein the flat laminate film secondary battery has a power generating element including alternating layers of a positive electrode, a separator and a negative electrode.

28. The primary battery of claim 25, wherein said sealing section area is sandwiched and mechanically clamped while the primary battery is used.

* * * * *